United States Patent

Sands

[15] 3,635,676

[45] Jan. 18, 1972

[54] METHOD FOR INCREASING THE STRENGTH OF CARBON FOAM

[72] Inventor: Arthur E. Sands, Oak Ridge, Tenn.

[73] Assignee: The United States of America as represented by the United States Atomic Energy Commission

[22] Filed: Nov. 5, 1969

[21] Appl. No.: 874,380

[52] U.S. Cl...........................23/209.4, 23/209.1, 23/209.2, 264/29
[51] Int. Cl. .......................................................C01b 31/02
[58] Field of Search .........................23/209.1, 209.2, 209.4; 264/29

[56] References Cited

UNITED STATES PATENTS

| | | | |
|---|---|---|---|
| 3,121,050 | 2/1964 | Ford .................................23/209.4 X |
| 3,302,999 | 2/1967 | Mitchell..............................23/209.2 |
| 3,342,555 | 9/1967 | McMillan ............................23/209.4 |
| 3,345,440 | 10/1967 | Googin et al. ..........................264/29 |
| 3,387,940 | 6/1968 | McHenry et al......................23/209.2 |

*Primary Examiner*—Edward J. Meros
*Attorney*—Roland A. Anderson

[57] ABSTRACT

Carbon foam of increased strength is produced by incorporating a fine particulate carbonizable material in the carbon foam ingredients including urethane foam producing components and a binder of partially polymerized furfuryl alcohol prior to the foam producing reaction. The carbonizable material provides cell forming nuclei for the urethane reactants to form a fine-celled structure. This material, on carbonization, shrinks essentially the same amount as the other foam components including the binder to obviate deleterious differences in shrinkage rates. Suitable carbonizable materials include synthetic resins, pitch, wood flour, wheat flour, sugar, and cornstarch.

1 Claims, No Drawings

METHOD FOR INCREASING THE STRENGTH OF CARBON FOAM

The present invention relates generally to the preparation of a cellular carbonaceous product commonly referred to as carbon foam, and more particularly to the incorporation of a carbonizable particular material in the foam producing formulation for increasing the modulus of elasticity and compressive strength of the carbon foam. This invention was made in the course of, or under, a contract with the U.S. Atomic Energy Commission.

Carbon foam possesses several physical properties, including low-bulk density, relatively high strength, and desirable thermal insulating characteristics, which make carbon foam useful in many structural applications, particularly those in which high temperatures are encountered.

While carbon foam produced by employing any one of several known formulations has proven to be satisfactory, particularly successful results have been achieved with carbon foamed prepared in accordance with teachings described in assignee's copending U.S. Pat. application, Ser. No. 849,204, filed Aug. 11, 1969 and issued as U.S. Pat. No. 3,574,548. Generally, the carbon foam described in the aforementioned patent application is prepared by admixing a binder of partially polymerized furfuryl alcohol with a urethane system which is capable of interacting to form a foam or cellular structure. The cellular structure incorporating the binder is cured and then heated to a temperature sufficient to thermally decompose the urethane and carbonize the binder. Low-density carbon foam is employed advantageously where weight is a problem, but the use of such foam in structural applications has been somewhat limited due to rather limited compressive strengths. Previous efforts to improve the compressive strength of the carbon foam while retaining the desired low density have not been particularly fruitful since the density of the foam has been found to increase with increases in the compressive strength. The present invention is particularly directed to the strengthening of carbon foam of the type described in the above patent application.

Accordingly, it is the primary objective of the present invention to provide a mechanism for increasing the modulus of elasticity and the compressive strength of carbon foam without significantly increasing the bulk density of the foam. Broadly, the above and other objects of the invention are accomplished by a method which comprises the incorporation of fine powder or particles of a carbonizable material in the carbon foam formulation prior to the foam producing reaction so as to provide nuclei about which the foaming components form during the formation of the foam cells. Thus, the particulates, in effect, control or regulate the size of the individual foam cells so as to provide a fine-celled structure which, upon carbonization, exhibits greater compressive strength characteristics while at a bulk density essentially the same as carbon foam prepared in a similar manner except for the particulate addition.

As briefly described above, the present invention is particularly suited for use in carbon foam produced in accordance with teachings in assignee's aforementioned patent application. This carbon foam is prepared by admixing a thermosetting resin binder of partially polymerized furfuryl alcohol containing less than 12 mole per cent of the alcohol monomer or free furfuryl alcohol with water and a foam producing urethane system. This mixture is then poured into a suitable mold, cured, and subsequently heated to a temperature sufficient to thermally decompose the urethane and carbonize the binder. The urethane system may be composed of selected urethane chemicals well known in the art for producing cellular urethane products but is preferably a two-component urethane system which comprises a polyhydric alcohol resin ("R" component) and tolylene diisocyanate ("T" component). The water reacts with the isocyanate to produce the gas (carbon dioxide) necessary for foaming the binder-urethane mixture. The T- and R-components react exothermally to provide a cross-linked structure which increases the strength of the carbonized product. The quantity of binder employed in the carbon foam formulation is sufficient to provide a binder-to-urethane ratio of 0.45–2.2 to 1.

To promote the urethane reaction by enhancing $CO_2$ evolution and cross-linking of the urethane constituents, a catalyst such as N-methylmorpholine is used. Also, a surfactant such as silicone or any other suitable nonionic material may be employed in the mixture for the purpose of regulating or stabilizing to some extent the size of the cells in the foam.

The carbon foam may be produced by initially mixing a desired quantity of the urethane R-component with a desired quantity of the thermosetting resin binder suitable for producing a single carbon foam product. After stirring this mixture for a suitable duration, e.g., 5 minutes, the T-component of the urethane system is added and the stirring continued for about 1 to 4 minutes depending upon the reactivity of the mixture. This mixture is then preferably poured into a mold of a desired configuration and of a material such as aluminum before the foaming action beings or is of any significance. It may be desirable to coat the mold surfaces contacting the foam mixture with a suitable mold-release material such as a silicone mold-release compound. The casting may then be maintained at room temperature while the foam rises or "blows" to is maximum height, which usually takes place in a time period of less than about 1 hour. Gelation is usually well advanced by the time the maximum height of the casting is attained and is usually sufficiently firm after about 16 hours of curing at room temperature to permit further processing. With the foam cured at room temperature for a duration sufficient to instill sufficient firmness in the foam to permit handling (usually about 2 hours after the foaming action is initiated), the casting may be removed from the mold so as to permit the rigid "skin" or "rind" formed on the foam during the cure period to be treated for facilitating outgassing during the subsequent curing and carbonization steps. This treatment may be achieved by scoring the rind with a suitable instrument, e.g., a saw, at about 0.5-inch intervals with each cut or incision being about 0.5 inch in depth. However, if desired, the rind may be removed for the same purpose. Such removal may be accomplished by any suitable mechanical means, e.g., a metal rasp. After the casting has become sufficiently firm and the rind scored or removed, the foam material is further cured in air at room temperature for a duration in the range of 10 to 20 days.

Following the above-described curing operation, the castings may be transferred to a high-temperature oven or furnace, e.g., a conventional muffle furnace, provided with an inert nonoxidizing atmosphere, e.g., nitrogen, argon, or the like. Within this high-temperature furnace the casting is subjected to a temperature sufficient to convert the urethane-binder composition to carbon. A temperature found to be satisfactory for this purpose is above about 450° C., but is preferably about 950°–1,000° C. During this high-temperature bake the furnace is preferably programmed to provide a slow rate of temperature increase from about 180° C. up to the desired carbonizing temperature for assuring that the thermal gradient between the outside and inside of the casting is not excessively large since such a condition would result in deleteriously high-internal pressures due to gases escaping at too slow a rate. This high-temperature bake may take place over a period of time ranging from about 36 hours up to about 240 hours depending on the density and size of the casting. The larger castings require the longer bake cycles due to the desirability of a slower rate of temperature increase.

The method of the present invention is practiced by incorporating the fine particles of carbonizable material in the above-described foam formulation, preferably by thoroughly blending with the urethane resin (R-component), and thereafter continuing the carbon foam preparation as described. The carbonizable materials suitable for use in strengthening carbon foam include organic chemicals such as high molecular-weight hydrocarbon derivatives of indene such as cinnamylidene and other thermosetting synthetic resins or other materials such as pitch, wheat flour, wood flour, sugar, and cornstarch. Of course, other carbonizable materials which function similarly to the aforementioned materials may be readily employed.

The mechanism by which the carbonizable particles increase the compressive strength of the carbon foam is believed to be due to the particles promoting cell nucleation during the foam forming reaction of the urethane components. With a desired quantity of the particles in the mixture, as will be discussed below, the foam cells are smaller and more uniform in size than normally provided. Also, the thickness of the cell walls is less than normally obtained without the particle addition, thereby insuring that the density of the carbon foam does not significantly increase even though a greater number of cells are present in the foamed structure.

The use of noncarbonized but carbonizable particulate material in the foam formulation is necessary in that while precarbonized or noncarbonizable additives apparently provide cell nucleation, they fail to shrink in the same manner as the remainder of the formulation during the carbonization of the latter so as to cause stresses and other strength robbing conditions. Carbonizable particles, on the other hand, provide the necessary cell nucleation and, on carbonization, are believed to blend in a homogeneous manner with the foam ingredients undergoing carbonization and, in any event, shrink in a similar manner.

The size of the carbonizable particles is less than 325 mesh (Tyler) since larger particles will not provide satisfactory cell nucleation. Also, the quantity of carbonizable particles employed in the carbon foam formulation has a significant effect upon the density and compressive strength of the carbon foam. It has been found that with a quantity of particles corresponding to about 5 to 15 weight percent of the urethane resin (R-component) of the urethane system the carbon foams produced as above described except for addition of the particles exhibit a significant increase in compressive strength with only slight increases in density, which can be readily compensated for by addition of water to the formulation. It is believed that the increases in the quantity of particles above about 15 percent of the urethane resin effect corresponding increases in the number of cells while simultaneously decreasing the cell wall thickness so as to deleteriously affect the compressive strength of the carbon foam. Quantities of particles amounting to less than about 5 weight percent of the urethane resin do not provide a sufficient number of the finer cells necessary to provide a marked increase in compressive strength of the carbon foam.

Expression of the quantity of carbonizable particles in weight percent of the urethane resin is believed to be appropriate since the amount of urethane resin used in the foam formulation remains in a fairly constant ratio with the urethane ingredients including the urethane T-component whereas the binder and water content varies considerably. The binder-to-urethane ratio is variable in the range of about 0.45–2.2 to 1 and the water content varies from about 0.5 to 20.0 weight percent of the urethane resin depending on the particular density of the foam desired. Thus, with a binder-to-urethane ratio of 0.65 to 1 the urethane resin required to produce a 24-inch cube of carbon foam with a density of 0.05 gm./cc. is approximately 2,900 grams. With this amount of resin the quantity of particles useable in the formulation is approximately 145 to 435 grams (5–15 weight percent of the urethane resin) which provides a maximum of about 3.8 weight percent of the total weight of the binder and urethane components. However, with a greater binder-to-urethane ratio the last-mentioned weight percent would decrease so as to render the expression of carbonizable particle content as a percentage of the total weight of the formulation somewhat unreliable.

Comparisons of the compressive strengths and the averages in the modulus of elasticity of carbon foams prepared in similar manners except for the use of the carbonizable particles in accordance with the present invention are compiled in tables I–III below. In tables I and II cornstarch was used as the carbonizable material, but other materials such as mentioned above provide corresponding increases in compressive strengths as shown in table III.

TABLE I

| Average Density (gm./cc.) | Average modulus of elasticity ($\times 10^3$ p.s.i.) | Average maximum compressive strength within 0.2" deflection (p.s.i.) | Cornstarch content |
|---|---|---|---|
| 0.060 | 6.0 | 76 | None. |
| 0.064 | 10.4 | 114 | 10 wt. percent Resin. |
| 0.061 | 8.8 | 102 | Do. |

TABLE II

[Castings have a density of 0.05 gm./cc. ±2%]

| Cornstarch content | Average modulus of elasticity ($\times 10^3$ p.s.i.) | Average maximum compressive strength within 0.2" deflection (p.s.i.) |
|---|---|---|
| None | 5.0 | 53 |
| 5 wt. percent resin | 5.9 | 71 |
| 10 wt. percent resin | 8.4 | 90 |
| 15 wt. percent resin | 8.6 | 86 |

TABLE III

| Kind of powder | Amount added | Carbon foam prepared with carbonizable particles | | Carbon foam prepared without carbonizable particles | |
|---|---|---|---|---|---|
| | | Density (gm./cc.) | Compressive strength (p.s.i.) | Density (gm./cc.) | Compressive strength (p.s.i.) |
| Wheat flour | 5 wt. percent of urethane resin | 0.063 | 98 | 0.062 | 72 |
| Powdered sugar | do | 0.053 | 70 | 0.050 | 40 |
| Cornstarch | 10 wt percent of urethane resin | 0.061 | 102 | 0.062 | 72 |

In table III the binder-to-urethane ratio was 0.55 to 1.

It will be seen that the method of the subject invention provides a unique procedure for significantly increasing the modulus of elasticity and the compressive strength of carbon foam without introducing a significant change in the bulk density of the carbon foam. With such increases in the compressive strength of carbon foam the use of the latter may be advantageously exploited in applications requiring greater strength than previously available at required densities.

I claim:

1. In the art of manufacturing a cellular carbonaceous structure by admixing partially polymerized furfuryl alcohol with urethane compounds comprising a resin and an isocyanate which are capable of interacting to form a cellular urethane structure, curing the cellular structure resulting from the interaction of the urethane compounds, and thereafter heating the cellular structure to a temperature sufficient to thermally decompose the urethane and carbonize the furfuryl alcohol for forming the carbonaceous structure, an improvement in the manufacture of said carbonaceous structure whereby the modulus of elasticity and the compressive strength of the structure are substantially increased with virtually no increase in the density of the structure, said improvement comprising the step of admixing with the furfuryl alcohol and the urethane compounds prior to the interaction thereof a carbonizable material in particulate form of a size less than 325 mesh and a quantity corresponding to about 5 to 15 weight percent of said resin to provide cell forming nuclei for the urethane compound reactants, said carbonizable material being selected from the group consisting of synthetic resins, pitch, wood flour, wheat flour, sugar, and cornstarch, said temperature sufficient to carbonize the furfuryl alcohol being adequate to convert said carbonizable material to carbon.

* * * * *